United States Patent [19]

Tanabe et al.

[11] Patent Number: 5,207,857
[45] Date of Patent: May 4, 1993

[54] FORCED ALIGNING JIG FOR LOOSE WIRES

[75] Inventors: Akio Tanabe; Kazuo Hashimoto; Hideki Watanabe; Hiroyuki Yatsu, all of Tokyo, Japan

[73] Assignee: The Furukawa Electric Co., Ltd., Tokyo, Japan

[21] Appl. No.: 705,288

[22] Filed: May 24, 1991

[30] Foreign Application Priority Data

May 29, 1990 [JP] Japan .............................. 2-56259[U]

[51] Int. Cl.⁵ .................. B32B 5/00; B32B 31/12; G02B 6/08
[52] U.S. Cl. .................................. 156/441; 140/147; 156/296; 156/578; 385/114
[58] Field of Search ............... 385/114, 135, 136, 137; 269/903, 43, 126, 239, 296, 299, 301, 902; 29/468, 271; 140/140, 147; 156/578, 296, 441, 558

[56] References Cited

U.S. PATENT DOCUMENTS

| 3,819,442 | 6/1974 | Brushenko | 156/296 |
| 3,989,578 | 11/1976 | Hashimoto | 385/136 |
| 4,385,801 | 5/1983 | Bubanko | 350/96.21 |
| 4,445,678 | 5/1984 | George | 269/902 |
| 4,666,244 | 5/1987 | Van der Velde et al. | 350/96.23 |
| 4,724,024 | 2/1988 | Van Der Velde et al. | 156/181 |
| 4,750,804 | 6/1988 | Osaka et al. | 385/137 |
| 4,811,936 | 3/1989 | Laymaster | 269/902 |
| 4,812,010 | 3/1989 | Osaka et al. | 350/96.21 |
| 4,980,007 | 12/1990 | Ferguson | 156/296 |

FOREIGN PATENT DOCUMENTS

| 0097414 | 1/1984 | European Pat. Off. . |  |
| 0253457 | 1/1988 | European Pat. Off. . |  |
| 2525132 | 5/1976 | Fed. Rep. of Germany . |  |
| WO80/00498 | 3/1980 | France . |  |
| 97316 | 4/1989 | Japan | 156/296 |
| 1-285902 | 11/1989 | Japan . |  |

*Primary Examiner*—Michael W. Ball
*Assistant Examiner*—Steven D. Maki
*Attorney, Agent, or Firm*—Frishauf, Holtz, Goodman & Woodward

[57] ABSTRACT

A forced aligning jig for forcedly aligning a plurality of loose wires. It is provided with a retaining means for retaining the plurality of loose wires, a guiding means which has one end and the other end and one end is fixed to the retaining means and an aligning means which is slidably supported by the guiding means and forcedly aligns the plurality of loose wires, and the aligning means is provided with an aligning groove for aligning and storing the plurality of loose wires retained by the retaining means and a holding means for holding the plurality of loose wires have been stored in the aligning groove in an aligned state.

13 Claims, 11 Drawing Sheets 5,207,857

FORCED ALIGNING JIG FOR LOOSE WIRES

BACKGROUND OF THE INVENTION

This invention relates to a forced aligning jig for forcedly aligning a plurality of loose wires.

CROSS-REFERENCE TO RELATED APPLICATIONS

As a device for fusion bonding a plurality of optical fibers in a batch at a time, a fusion bonding device utilizing discharge fusion bonding, for example, has been put to practical use.

In fusion bonding by such a fusion bonding device, a plurality of optical fibers are connected separately at their tip end parts, but as it is easier to handle them if they were in a body for handling, a fiber ribbon, in which a plurality of optical fibers are covered in a body in a tape form, is used.

Thus, when a plurality of loose tube type multi-fiber optical fibers (hereinafter referred to as loose optical fibers) are to be connected by a fusion bonding device, a jig for pretreating and aligning them in a tape form and for forceably holding this form for the time being is required. Such a jig is disclosed, for example, in the Japanese Patent Provisional Publication No. Heil-285902 and the U.S. Pat. No. 4,812,010, etc. as a jig for handling a plurality of loose optical fibers.

However, as the above jigs are complex in structure and large in size, handling of the jigs is troublesome and only those who are proficient in handling can manage them. Moreover, there is a problem that the jigs are expensive.

BRIEF SUMMARY OF THE INVENTION

The present invention has been made in view of the aforesaid drawbacks, and it is an object of the present invention to provide a small-sized forced aligning jig with simple structure for loose wires.

Another object of the present invention is to provide a forced aligning jig for loose wires, which is easy to handle and can be handled by any one.

Still another object of the present invention is to provide an inexpensive forced aligning jig for loose wires.

To achieve the above objects, there is provided in accordance with the present invention a jig provided with a retaining means for retaining one end side of a plurality of loose wires, a guide means which has one end and the other end and one end is fixed to the retaining means, and an aligning means slidably supported by the above guide means for forceably aligning the above plurality of loose wires, and an aligning groove for aligning and storing the one end side of the above plurality of loose wires and a holding means for holding the above plurality of loose wires which have been stored in the aligning groove in an aligned state are provided in the aligning means.

Preferably, the above guide means is provided with a stopper means at the other end.

Further preferably, as for the above aligning means, it is set so that the groove width W of the aligning groove is larger than the diameter D of the loose wire and less than two times the diameter D ($D < W < 2D$), and the relation of the depth T of the aligning groove to the number n of loose wires and the diameter D is $T = n \cdot D$.

DETAILED DESCRIPTION

Embodiment 1

An embodiment of the present invention will hereinafter be described in detail with reference to FIG. 1 through FIG. 7.

Figure 1:
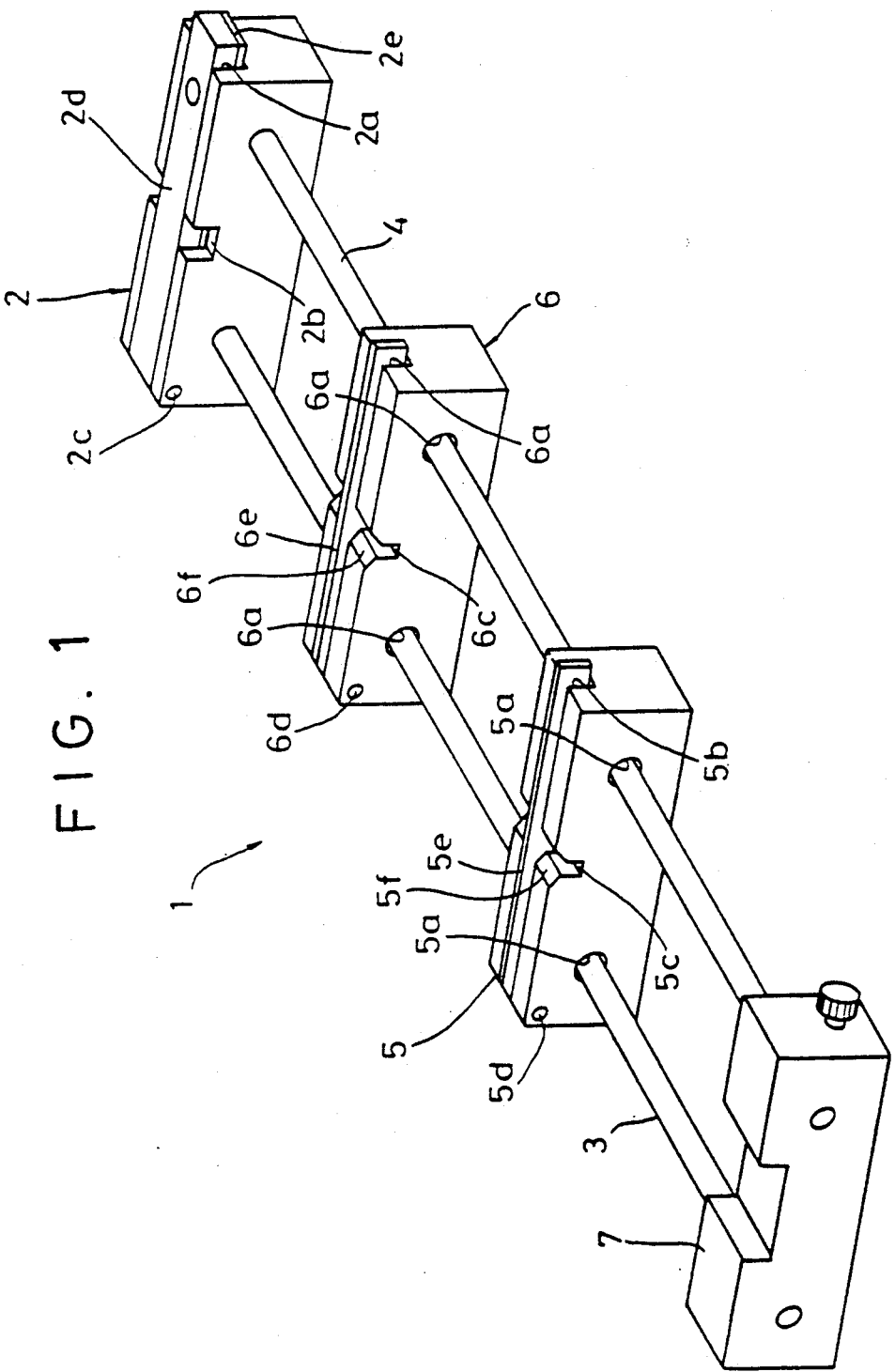
FIG. 1 is a perspective view illustrating a forced aligning jig in accordance with the first embodiment of the present invention.
Figure 2:
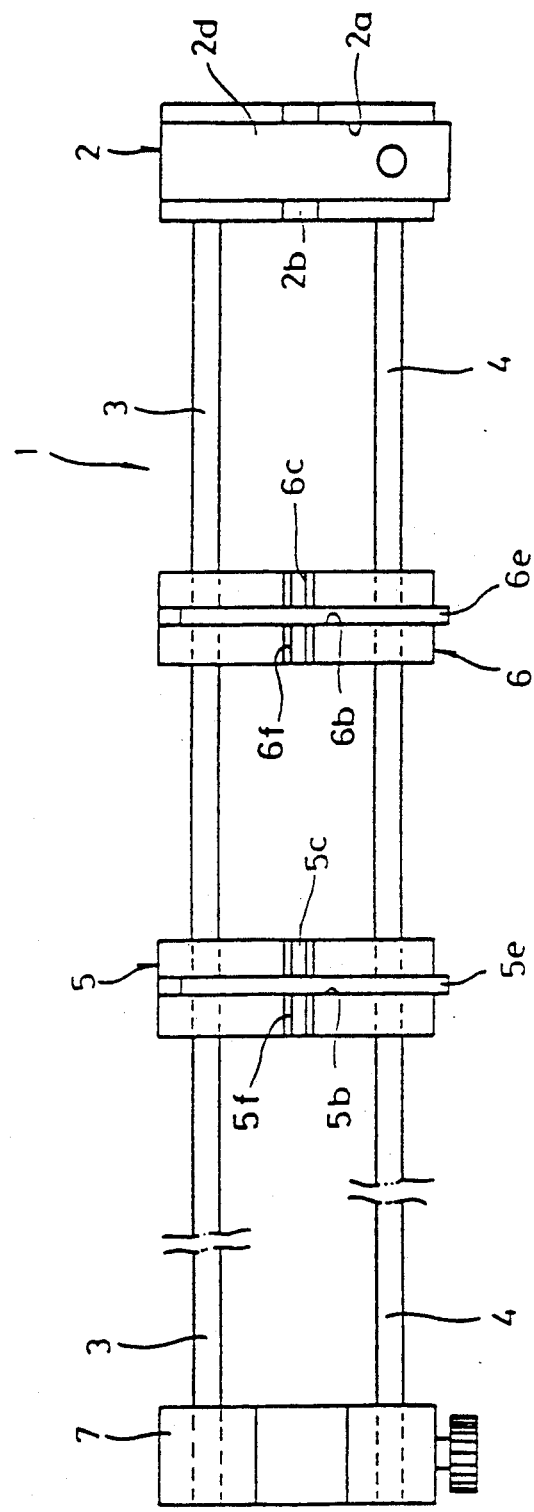
FIG. 2 is a top plan view of a forced aligning jig shown in FIG. 1.
Figure 3:
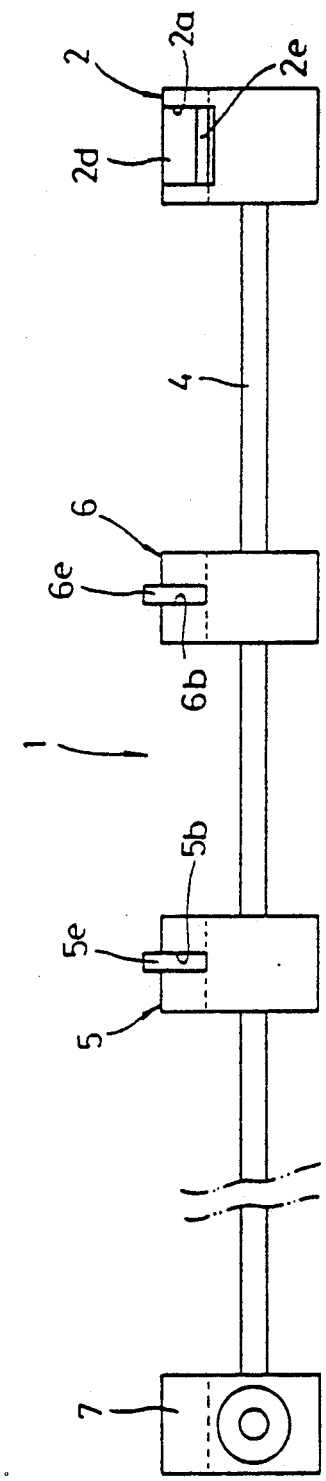
FIG. 3 is a front elevation of a forced aligning jig shown in FIG. 1.

A forced aligning jig 1 is provided with, as shown in FIG. 1 through FIG. 3, a retaining member 2, slide guides 3 and 4, slide members 5 and 6, and a stopper member 7.

The retaining member 2 is to retain one end side of a plurality of loose wires, for example, a plurality of loose optical fibers, and an arm groove 2a extending in the longitudinal direction is formed at the center of its upper part and a fiber groove 2b orthogonal to the arm groove 2a for storing the plurality of loose optical fibers is also formed at the center in the longitudinal direction. In the arm groove 2a, a retaining arm 2d whose one end is rotatably supported by a support axis 2c is inserted. On the lower surface opposite to the arm groove 2a, a friction material, for example, a rubber 2e is stuck.

The slide guides 3 and 4 which are bar-shaped members for slidably supporting the slide members 5 and 6 and guiding their movement in the longitudinal direction are arranged in parallel with a predetermined interval between the retaining member 2 and the stopper member 7. Here, the length of the slide guides 3 and 4 is set as the length that at least the slide member 5 is moved relatively to the slide member 6 and both the members 5 and 6 are capable of separating from each other by a predetermined distance.

The slide members 5 and 6 are aligning means for forceably aligning the one end side of the plurality of loose optical fibers retained by the retaining member 2 into a single line. As both the members 5 and 6 are the members of the identical constitution, the slide member 5 will be described and description of the other slide member 6 will be omitted with giving corresponding symbols to the corresponding parts in the drawings.

Slide holes 5a and 5a into which the slide guides 3 and 4 are inserted are provided through the slide member 5 in the width direction, and a storing groove 5b extending in the longitudinal direction and an aligning groove 5c orthogonal to the storing groove 5b are formed at the center on the upper surface.

Figure 4:
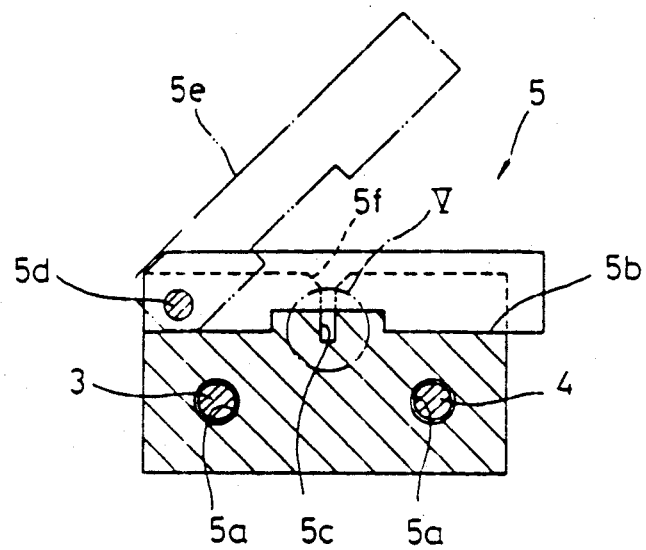
FIG. 4 is a fragmentary sectional view of an aligning means used for a forced aligning jig shown in FIG. 1.

In the storing groove 5b, as shown in FIG. 1 and FIG. 4, a holding piece 5e whose end is supported by a support pin 5d is stored and is capable of being raised and lowered. In the meantime, the aligning groove 5c is to align and store the one end side of the above plurality of loose optical fibers in a predetermined order, and at its upper end part opened to the upper surface of the slide member 5, as shown, inclined surfaces 5f which are inclined toward the groove for guiding storage of the above plurality of optical fibers are formed.

Figure 5:
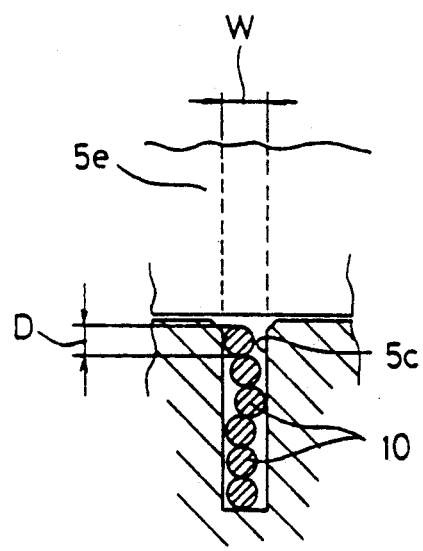
FIG. 5 is an enlarged view of a V part in FIG. 4.

Here, the groove width of the aligning groove 5c is determined by the diameter of the loose wire to be stored, and it is set, as shown in FIG. 5, that the groove width W is larger than the diameter D of a loose optical fiber 10 and less than two times the diameter D ($D < W < 2D$) so that the loose wires, for example, the plurality of the loose optical fibers 10 are aligned into a line in the vertical direction.

When the groove width W is less than the diameter D, the loose optical fibers 10 can not be stored in the aligning groove 5c, or if it is more than two times the diameter D, the loose optical fiber cores 10 are replaced vertically in the aligning grove 5c, which can not be kept aligned in a line in a predetermined order in the vertical direction.

Also, the depth T of the aligning groove 5c is set as $T = n \cdot D$ corresponding to the number n of the loose optical fibers 10 to be stored, taking into account the state where the stored loose optical fibers 10 are kept in alignment by the holding piece 5a in the aligning groove 5c. If the depth T is less than the product $n \cdot D$ of the diameter D and the number n of the loose optical fibers 10, all the loose optical fibers can not be stored in the aligning groove 5c.

The stopper member 7 is a member to regulate movement of the slide member 5 which slides guided by the slide guides 3 and 4 and gives rigidity against torsion to this forced aligning jig 1 by supporting the slide guides 3 and 4 together with the retaining member 2.

The forced aligning jig 1 of this embodiment is constituted as above and used as following when, for example, a plurality of loose optical fibers are aligned in a tape form to be fusion bonded in a batch.

First, both the slide members 5 and 6 of the forced aligning jig 1 are moved to the retaining member 2 side, and a plurality of the loose optical fibers 10 are retained by the retaining member 2. That is, the tip end side of a plurality of loose optical fibers 10 is extended to the stopper member 7 side, the plurality of loose optical fibers 10 are stored in the fiber groove 2d, and the retaining arm 2d is laid in the arm groove 2a. At this time, the loose plurality of optical fibers 10 are stored in the fiber groove 2d so that they are spread in the horizontal direction and firmly retained between the fiber groove 2d and the retaining arm 2d by the rubber 2e stuck on the lower surface of the retaining arm 2d.

Then, the holding pieces 5e and 6e are raised, and the plurality of loose optical fibers 10 are dropped into the aligning grooves 5c and 6c of the adjoining slide members 5 and 6. At this time, the plurality of loose optical fibers 10 are stored in both the aligning grooves 5c(6c), as shown in FIG. 5, without their vertical alignment order disturbed.

Next, the holding pieces 5e and 6e are lowered so as to keep these loose optical fibers 10 in the alignment state in the aligning grooves 5c and 6c.

Then, only the slide member 5 is moved to the stopper member 7 side along the slide guides 3 and 4. Then, as the plurality of loose optical fibers 10 are retained by the retaining member 2 and kept in the alignment state in the aligning grooves 5c and 6c with the holding pieces 5e and 6e, the plurality of loose optical fibers 10 between the slide members 5 and 6 are stroked by movement of the slide members 5, and the plurality of loose optical fibers 10 are aligned to a line in a tape form.

In this state, an adhesive or the like is applied to the plurality of loose optical fibers 10 between the slide members 5 and 6 to bond them in a tape form.

In this way, the plurality of optical fibers 10 which have been loose are aligned and fixed in a tape form so that they can be fusion bonded in a batch.

Consequently, according to the forced aligning jig 1 of this embodiment, the plurality of loose wires can be easily aligned only by sliding the slide member 5 along the slide guides 3 and 4. Also, as the jig 1 is simple in structure and small in size, it can be manufactured at a low cost.

Figure 6:
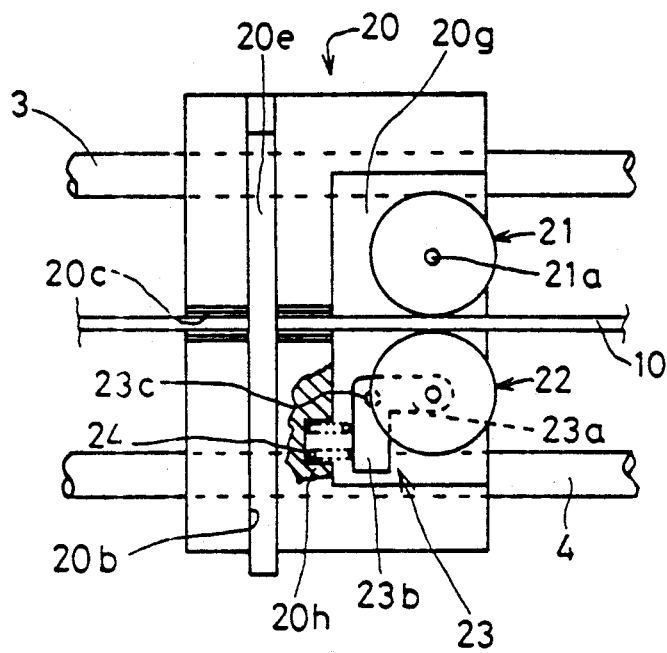
FIG. 6 is a partially cutaway plan view illustrating a variation of an aligning means.
Figure 7:
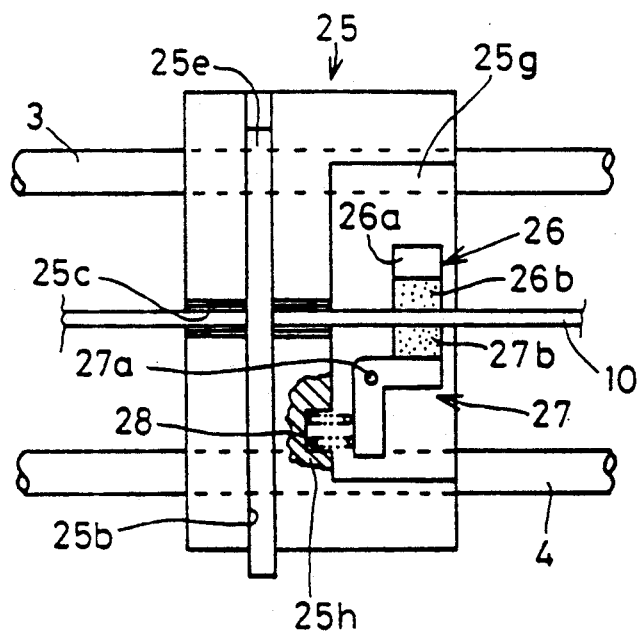
FIG. 7 is a partially cutaway plan view illustrating another variation of an aligning means.

Next, a variation of the aligning means which enables alignment of the plurality of loose optical fibers 10 and application of an adhesive carried out at the time will be shown in FIG. 6 and FIG. 7. In each of the FIGS., the same components as with the above embodiment and the same component in both the FIGS. shall be given corresponding symbols for briefness.

In a slide member 20 shown in FIG. 6, a recess part 20g is formed adjacent to a storing groove 20b, and application rollers 21 and 22 are provided in this recess part 20g.

The application rollers 21 and 22 is to retain the plurality of loose optical fibers 10 and to apply an adhesive of polyvinyl alcohol or the like, and the adhesive is applied prior to their use. The application roller 21 is rotatably installed at a support axis 21a stood at the recess part 20g, and the application roller 22 is rotatably installed at a force-applying arm 23.

The force-applying arm 23 is an L-shaped arm having a support part 23a and a force-applying part 23b, in which an intersection part of the support part 23a and the force-applying part 23b is rotatably installed at the recess part 20g with the support axis 23c, and the force applying part 23b is pressed by a force-applying spring 24 provided between the arm 23 and a wall surface 20h of the slide member 20. By this, force is applied to the force-applying arm 23 all the time in the counter-clockwise direction so that the application roller 22 holds the plurality of loose optical fibers 10 together with the application roller 21.

Accordingly, in aligning the plurality of loose optical fibers 10, when the plurality of loose optical fibers 10 stored in the aligning groove 20c are held between the application rollers 21 and 22 and this slide member 20 is moved to the stopper member 7 side along the slide guides 3 and 4, an adhesive is applied at the same time to the plurality of loose optical fibers which are aligned to a line in a tape form.

Also, a slide member 25 shown in FIG. 7 is provided with an application member 26 and an application arm 27 at a recess part 25g.

The application member 26 is a bracket 26a provided at the recess part 25g to which a sponge 26b is attached. The application arm 27 is an L-shaped arm provided opposite to the application member 26 and rotatably provided at the recess part 25g with a support axis 27a, and a sponge 27b is attached to the portion corresponding to the sponge 26b of the application member 26. And a force is applied to the application arm 27 by a force-applying spring 28 put between the arm 27 and a wall surface 25h of the slide member 25, and the application arm 27 holds the plurality of loose optical fibers 10 between the sponge 27b and the sponge 26b of the application member 26. Here, the sponges 26b and 27b are impregnated with an adhesive in advance prior to the use of the forced aligning jig 1.

Accordingly, the slide member 25, as to the above slide member 20, holds the plurality loose optical fibers 10 which have been stored in the aligning groove 25c with the sponges 26b and 27b when aligning the plurality of optical fibers 10. And when this slide member 25 is moved to the stopper member 7 side along the slide guides 3 and 4, the plurality of loose optical fibers 10 are aligned to a line in a tape form as well as the adhesive is applied and bonded in a body at the same time.

Though the slide guides 3 and 4 are used as guiding members in the above embodiment, it is, needless to say, not limited to that. For example, it can be a single guide rail or three slide guides arranged parallel to each other, only if they can guide the slide member.

Also, though the case using the optical fibers as loose wires has been described in the above embodiment, the subject to be used is not limited to the optical fibers, only if forced alignment is the purpose.

Moreover, though two slide members 5 and 6 are used in the above embodiment as aligning means, either one of them can achieve the object of the present invention.

Also, though the stopper member 7 is provided at the other ends of the slide guides 3 and 4, it can be so constituted that a set screw is provided at the slide member 5 which is moved along the slide guides 3 and 4 and the slide member 5 is fixed to the slide guide 3 with this set screw.

Embodiment 2

Figure 9:
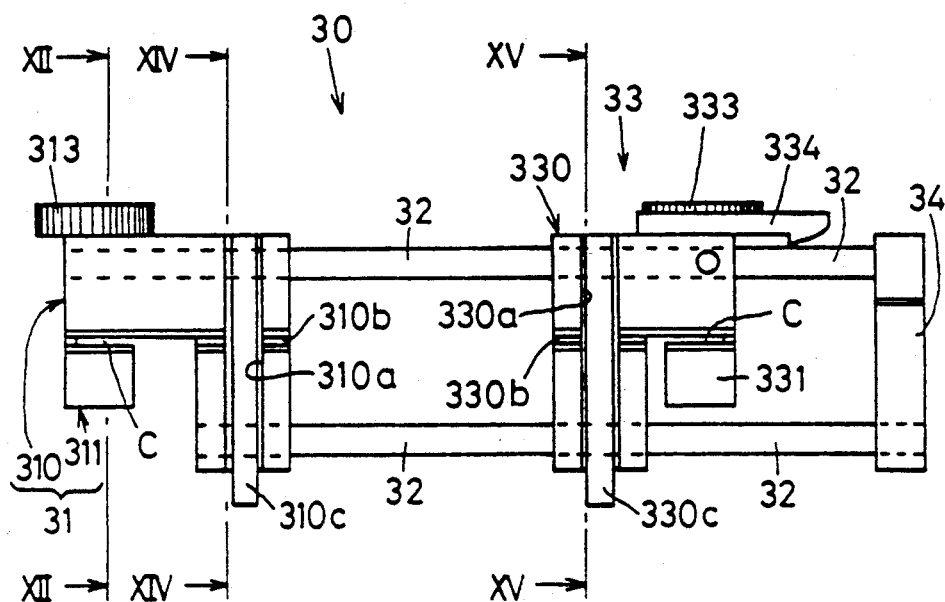
FIG. 9 is a top plan view of a forced aligning jig shown in FIG. 8.
Figure 10:
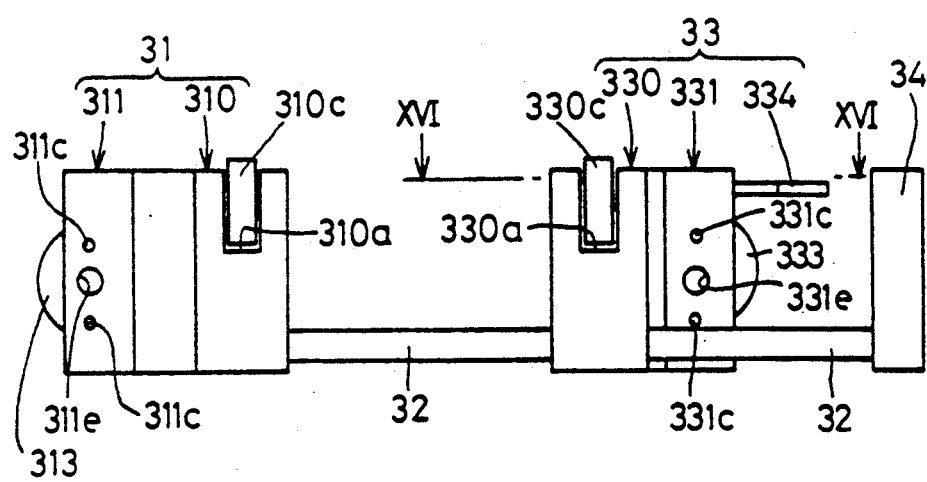
FIG. 10 is a front elevation of a forced aligning jig shown in FIG. 8.

Next, the second embodiment of the present invention will be described in detail with reference to FIG. 8 through FIG. 17. A forced aligning jig 30 is provided with, as shown in FIG. 8 through FIG. 10, a retaining means 31, slide guides 32 and 32, an aligning means 33 and a stopper means 34.

The retaining means 31 is to retain, for example, one end side of a plurality of loose optical fibers and has a retaining member 310 and a retaining block 311.

The retaining member 310 is a member which is integrally formed in an L-shape viewed from the top, and at the center on the upper surface on the aligning means 33 side, a storing groove 310a and an aligning groove 310b orthogonal to this storing groove 310a are formed.

Figure 8:
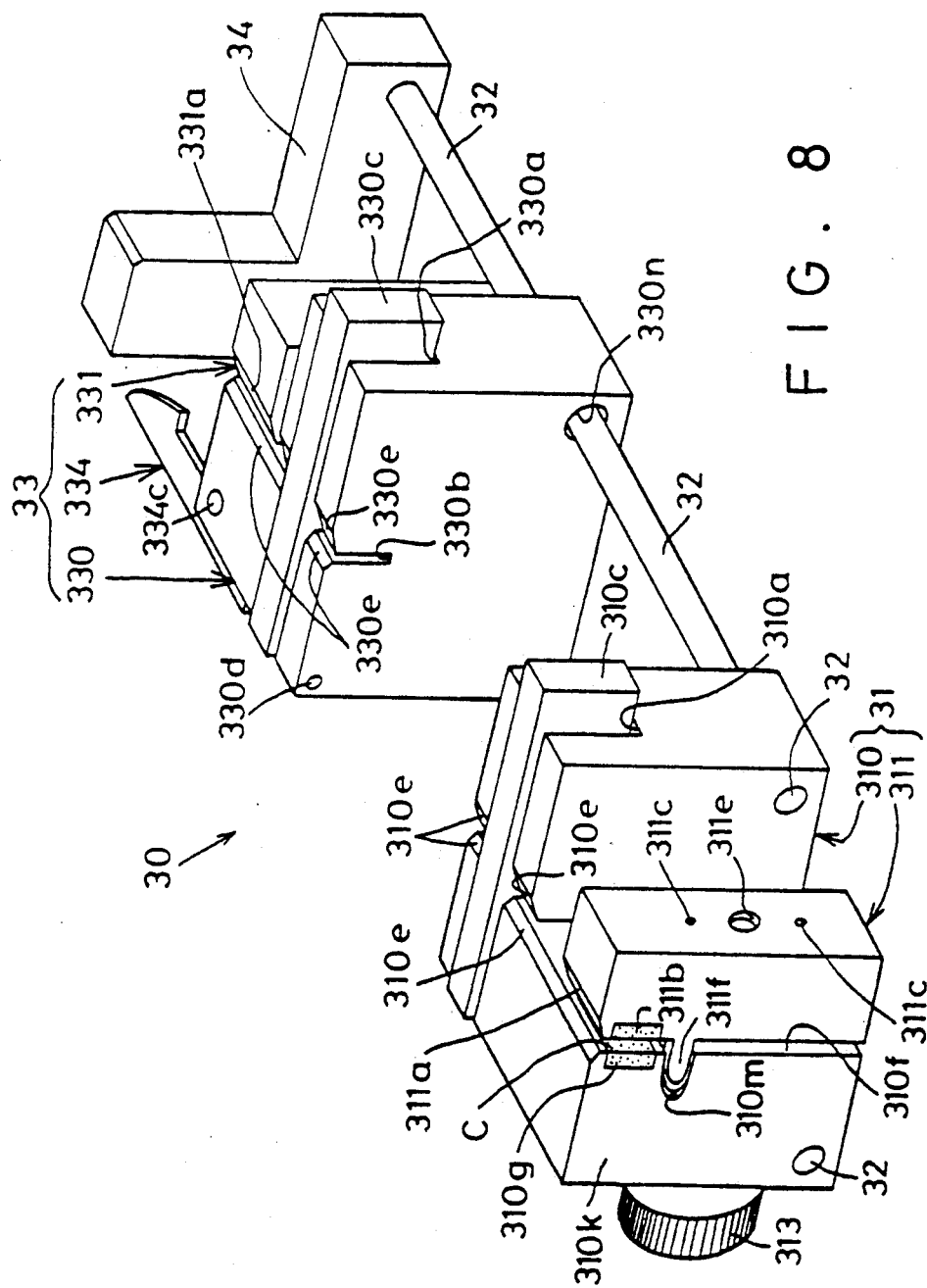
FIG. 8 is a perspective view illustrating a forced aligning jig of the second embodiment of the present invention.
Figure 14:
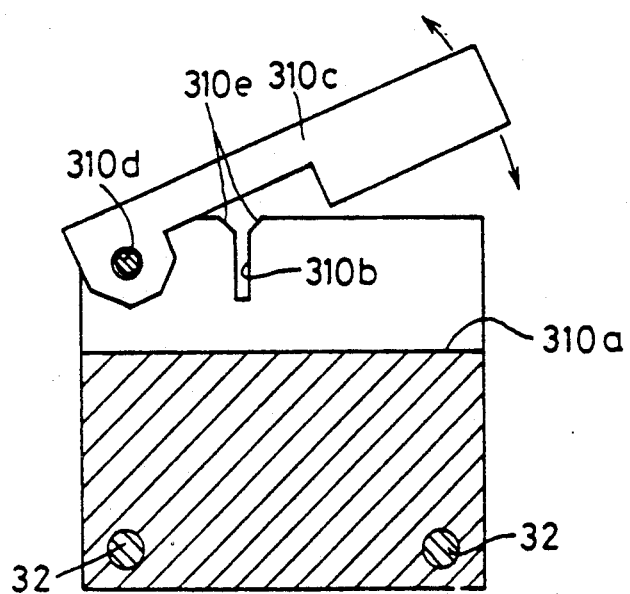
FIG. 14 is a cross-sectional view along the line XIV—XIV of FIG. 9.
Figure 15:
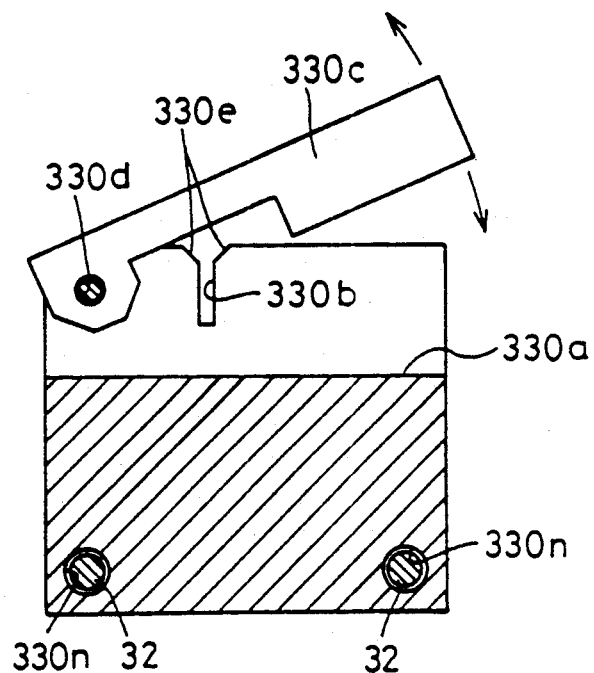
FIG. 15 is a cross-sectional view along the line XV—XV of FIG. 9.
Figure 16:
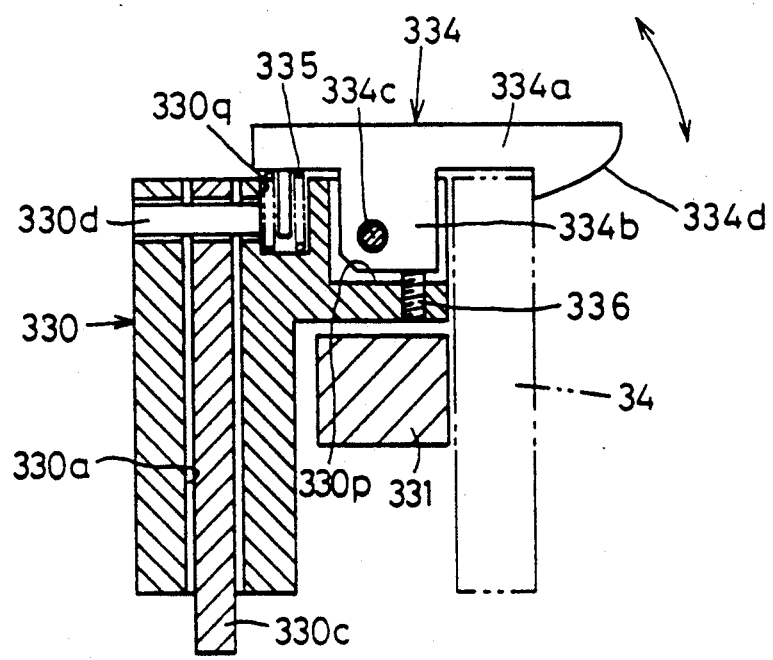
FIG. 16 is a cross-sectional view along the line XVI—XVI of FIG. 10.

The storing groove 310a stores, as shown in FIG. 8 and FIG. 14, a holding piece 310c in capable of being raised and lowered, and one end of the holding piece 310c is supported by a support pin 310d.

The aligning groove 310b is to store the one end side of the plurality of loose optical fibers, and on either sides of the upper part, as shown in FIG. 14, inclined surfaces 310e for inclinedly guiding the above plurality of loose optical fibers into the groove are formed, and one of the inclined surfaces 310e, as shown in FIG. 8 and FIG. 9, extends along the upper edge of the retaining member 310 to the position opposite to the retaining block 311.

Here, the aligning groove 310b is set, as with the above mentioned forced aligning jig 1, so that the groove width W is larger than the diameter D of the loose wire such as loose optical fiber to be aligned and less than two times the diameter D ($D<W<2D$), and the depth T at $T=n\cdot D$ corresponding to the number n of the loose wires to be stored.

If the groove width W is less than the diameter D, the loose wires can not be stored in the aligning groove 310b, and if it is more than two times the diameter D, the loose wires are vertically replaced in the aligning groove 310b and they can not be aligned to a line in a predetermined order in the vertical direction. In the meantime, if the depth T of the aligning groove 310b is less than n·D, all the plurality of loose wires can not be stored in the aligning groove 310b.

Figure 11:
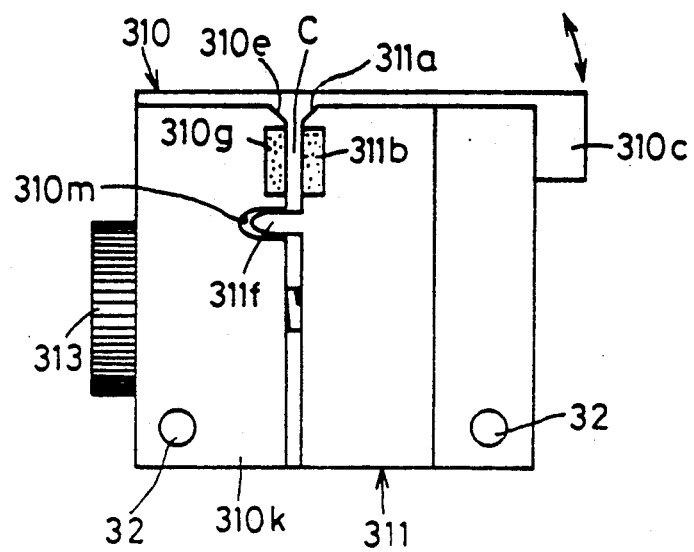
FIG. 11 is a left side view of a forced aligning jig shown in FIG. 8.
Figure 12:
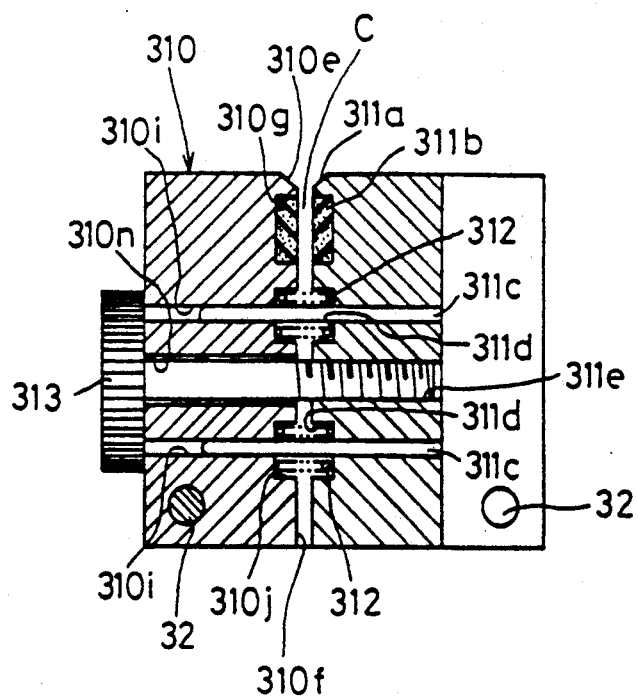
FIG. 12 is a cross-sectional view along the line XII—XII of FIG. 9.
Figure 13:
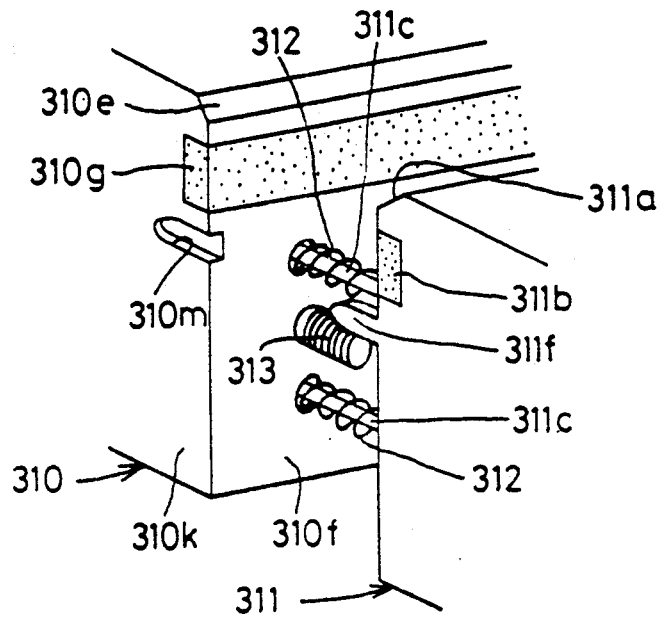
FIG. 13 is an enlarged perspective view showing an essential part of a retaining means in a forced aligning jig.

Also, in the retaining member 310, a retaining rubber 310g for retaining the plurality of loose optical fibers is attached at the upper part as shown in FIG. 11 through FIG. 13 on the opposite surface 310f to the retaining block 311, and almost at the center on the opposite surface 310f side, an inserting hole 310n which penetrates in the width direction and pin holes 310i and 310i above and under the inserting hole 310n are formed. Moreover, in the retaining member 310, recess parts 310j are provided respectively at the portions to which each of the pin holes 310i are opened on the opposite surface 310f, and a guide groove 310m is formed on a side end surface 310k adjoining the opposite surface 310f.

The retaining block 311 is to be brought into contact with the retaining member 310 and to retain one end side of the plurality of loose optical fibers, and as shown in FIG. 8, FIG. 12 and FIG. 13, an inclined surface 311a, a retaining rubber 311b, guide pins 311c and 311c, recess parts 311d and 311d and a screw hole 311e are provided at the positions corresponding to each portion on the retaining member 310, and a guide projection 311f to be engaged with the guide groove 310m of the retaining member 310 is provided on the side end surface.

And in the retaining block 311, as shown in FIG. 12 and FIG. 13, pressing springs 312 and 312 are put between each of the recess parts 310j and 311d, the guide pins 311c and 311c are inserted into the pin holes 310i and 310i from the opposite surface 310f side, a clamp screw 313 is inserted from the inserting hole 310n side, and the tip end side of the clamp screw 313 is screwed into the screw hole 311d and installed on the retaining member 310.

The slide guides 32 and 32 are rod-state member for slidably supporting the aligning means 33 and guiding movement in the longitudinal direction and are arranged in parallel between the lower parts of the retaining means 31 and the stopper means 34 with a predetermined interval.

The aligning means 33 is to forceably aligning one end side of the plurality of loose optical fibers retained by the retaining means 31 in a line and has, as shown in FIG. 8 through FIG. 10 and FIG. 15, a retaining member 330, a retaining block 331 and a fixed hook 334.

Here, as the arrangement of the retaining member 330 and the retaining block 331 is symmetrical with that of the retaining member 310 of the retaining means 31 and the retaining blocks 311 and they are similarly constituted except that slide holes 330n and 330n through which the slide guides 32 and 32 are inserted are provided in the width direction at both sides of the lower part of the retaining member 330, detailed description will be omitted while giving corresponding symbols to the portions corresponding to those of the retaining means 31. However, as for the retaining block 331, when the retaining member 330 is moved so as to align the plurality of loose optical fibers, a predetermined interval is formed between it and the retaining member 330 for arranging the plurality of loose optical fibers by loosening a clamp screw 333.

The fixed hook 334 is to lock the aligning means 33 onto the stopper member 34 when the aligning means 33 is moved to the stopper member 34 side along the slide guides 32 and 32 and is provided on the side surface of the upper part of the retaining member 330. This fixed hook 334 has, as shown in FIG. 14, a hook bar 334a provided with a hook at its tip end and a support part 334b provided almost at the center of the hook bar 334a, in which the support part 334b is arranged at a recess part 330p formed on the side surface of the upper part of the retaining member 330, and is rotatably in the arrow direction installed at the retaining member 330 by a rotation axis 334c provided at the support part 334b.

Here, in the hook bar 334a, a working face 334d with the stopper member 34 is formed in an arc shape in the tip end hook. An end part of the hook bar 334a is pressed by a push spring 335 inserted into a spring hole 330q formed in the retaining member 330, and a force is applied all the time to the fixed hook 334 in the engagement direction with the stopper member 34. And in the fixed hook 334, the rotation angle of the hook bar 334a to the stopper member 34 side is adjusted by an adjusting screw 336 which is provided on the retaining member 330 side and projects into a recess part 330p.

Figure 17:
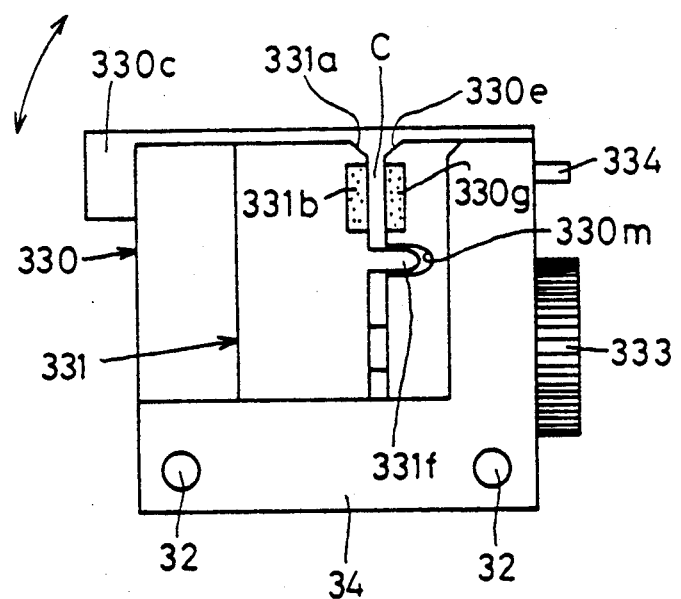
FIG. 17 is a right side view of a forced aligning jig shown in FIG. 8.

The stopper member 34 is, as shown in FIG. 8 and FIG. 17, an L-shaped member for regulating movement of the aligning means 33 moved guided by the slide guides 32 and 32 and supports the slide guides 32 and 32 together with the retaining member 310 as well as gives rigidity to this forced aligning jig 30 against torsion.

Here, for example, if a set screw for fixing the aligning means 33 to the slide guide 32 is provided on the retaining member 330 and the aligning means 33 is fixed to the slide guide 32 with this set screw, the stopper member 34 is not necessarily an indispensable member. Therefore, when the stopper member 34 is not used, the fixed hook 334 is not necessary, either.

The forced aligning jig 30 of this embodiment constituted as above is used as follows for aligning loose wires, for example, a plurality of loose optical fibers in a tape form.

First, the aligning means 33 is moved to the retaining means 31 side, the clamp screws 313 and 333 of the retaining means 31 and the aligning means 33 are loosened respectively, and intervals between the retaining member 310 and the retaining block 311, and the retaining member 330 and the retaining block 331 are widened. At this time, the retaining blocks 311 and 331 hold the intervals with the retaining members 310 and 330 to such an extent that the guide projections 311f and 331f do not come off the guide grooves 310m and 330m of the retaining members 310 and 330.

Next, the holding pieces 310c and 330c of the retaining members 310 and 330 are raised, and upper parts of the aligning grooves 310b and 330b are left open.

Then, as with the above embodiment, a plurality of loose wires, for example, a tip end side of a plurality of loose optical fibers to which pretreatment such as removal of coating at the tip ends has been given are generally aligned.

After that, these plurality of loose optical fibers are dropped into the interval C (see FIG. 11) between the retaining member 310 and the retaining block 311 in an arbitrary order with their tip end side toward the stopper member 34 so that the portion of about 20 cm from the tip end comes to the position of the retaining block 311. At this time, the drop position of the plurality of loose optical fibers which have been dropped into the interval C is regulated by the guide projection 310f engaged with the guide groove 310m.

Then, the clamp screw 313 is tightened, and the plurality of loose optical fibers are firmly retained by the retaining rubbers 310g and 311b of the retaining member 310 and the retaining block 311.

Next, according to the alignment order set in advance, the plurality of loose optical fibers are dropped into the aligning grooves 310b and 330b of the retaining member 310 and 330. In this case, too, the drop position of the plurality of loose optical fibers which have been dropped into the aligning groove 330b is regulated by the guide projection 331f engaged with the guide groove 330m. Also, the tip end side of the plurality of loose optical fibers are dropped into the interval C (see FIG. 17) between the retaining member 330 and the retaining block 331.

After that, the holding pieces 310c and 330c are laid in the storing grooves 310a and 330a respectively, and the plurality of loose optical fibers which have been stored in each of the aligning grooves 310b and 330b are held in an aligned state.

After the plurality of loose optical fibers are set on the forced aligning jig 30 in this way, the aligning means 33 is moved to the stopper member 34 side along the slide guides 32 and 32. Then, as the plurality of loose optical fibers are retained by the retaining member 310 and held in the aligning grooves 310b and 330b in an aligned state by the holding pieces 310c and 330c, the plurality of loose optical fibers between the retaining means 31 and the aligning means 33 are stroked by movement of the aligning means 33, and the plurality of loose optical fibers are aligned to a line in a tape form.

Moreover, when the aligning means 33 is moved to the stopper member 34 side, first the working face 334d at the tip end of the hook bar 334a runs into the stopper member 34.

When the aligning means 33 is further moved to the stopper member 34 side, the fixed hook 334 is rotated in the counter-clockwise direction in FIG. 14 with the rotation axis 334c as its center against the force applied by the push spring 335, guided by the working face 334d.

And when the aligning means 33 is brought into contact with the stopper member 34, the hook at the tip end of the fixed hook 334 is locked onto the side part of the stopper member 34 as shown in FIG. 14, and the aligning means 33 is fixed at the stopper member 34.

In this state, the clamp screw 33 of the aligning means 33 is tightened so as to retain the plurality of loose optical fibers between the retaining member 330 and the retaining block 331. By this, the plurality of loose optical fibers are retained by the retaining means 31 and the aligning means 33 respectively and brought into a tension state between the retaining means 31 and the aligning means 33.

In this way, after the plurality of loose optical fibers are retained by the retaining means 31 and aligning means 33 respectively and brought into a tension state between the retaining means 31 and the aligning means 33, an adhesive is applied to these plurality of loose optical fibers, dried and integrally bonded in a tape form.

Thus, the plurality of optical fibers which have been loose are aligned and fixed in a tape form so that they can be fusion bonded in a batch.

After that, the clamp screws 313 and 333 of the retaining means 31 and the aligning means 33 are loosened, the holding pieces 310c and 330c are raised, and the optical fibers which have been integrally bonded in a tape form are taken out of the aligning grooves 310b and 330b.

As is obvious from the above description, according to the forced aligning jig 30 of this embodiment, a plurality of loose wires such as loose optical fibers can be easily aligned only by sliding the aligning means 33 along the slide guides 32 and 32. Therefore, it is easy to handle the forced aligning jig 30, and even those who are not proficient can easily manage it.

Also, as the aligning means 33 is automatically locked onto the stopper member 34 when the loose wires are forceably aligned, alignment of the loose wires and successive bonding can be done very easily.

Moreover, compared with the forced aligning jig 1 of the above embodiment, as the number of parts is reduced for the forced aligning jig 30 of this embodiment, parts can be easily managed, which results in further compaction and manufacture at a lower cost.

Also, as the stopper member 34 is provided at the other end of the slide guides 32 and 32, rigidity of the forced aligning jig against torsion as well as mechanical strength is improved.

What is claimed is:

1. A forced aligning jig for loose wires, comprising:
   a retaining means for retaining a plurality of loose wires;
   a guiding means which has one end and another end, and wherein said one end is fixed to said retaining means;
   aligning means which is slidably supported by said guiding means and which forcibly aligns said plurality of loose wires; and
   a vertically extending aligning groove in said aligning means for aligning and storing the plurality of loose wires retained by said retaining means, and holding means in said aligning means for holding said plurality of loose wires which have been stored in said aligning groove in an aligned state;
   wherein said aligning groove is defined by vertical side walls and a bottom surface, the groove width between the vertical side walls is larger than a diameter D of a loose wire and less than two times the diameter D, and the relation of the depth T of said aligning groove to the number n of the loose wires and the diameter D is $T = n \cdot D$.

2. A forced aligning jig for loose wires according to claim 2, wherein said retaining means is provided with a retaining member and a retaining block for retaining said plurality of loose wires.

3. A forced aligning jig for loose wires according to claim 2, wherein a portion of said retaining member is provided with friction material and a portion of said retaining block is provided with friction material at portions where said plurality of loose wires are retained.

4. A forced aligning jig for loose wires according to claim 1, wherein said retaining means is provided with a regulating member for regulating a retaining position in a vertical direction of the plurality of loose wires to be stored in said aligning groove.

5. A forced aligning jig for loose wires according to claim 1, wherein said guiding means is provided with a stopper means at side another end.

6. A forced aligning jig for loose wires according to claim 1, wherein said holding means comprises a holding piece adapted to be raised and lowered in a storing groove provided orthogonal to said aligning groove.

7. A forced aligning jig for loose wires according to claim 1, wherein said aligning means comprises a retaining member and a retaining block for retaining said plurality of loose wires.

8. A forced aligning means for loose wires according to claim 7, wherein said retaining member and said retaining block are provided with friction materials at portions where said plurality of loose wires are retained.

9. A forced aligning jig for loose wires according to claim 1, wherein said aligning means further comprises application means for applying an adhesive to the aligned loose wires.

10. A forced aligning jig for loose wires according to claim 9, wherein said application means comprises a pair of rollers for applying an adhesive while holding loose wires between them.

11. A forced aligning jig for loose wires according to claim 9, wherein said application means comprises a pair of application members having application bodies which are impregnated with an adhesive and which apply the adhesive while holding the loose wires between them.

12. A forced aligning jig for loose wires, comprising:
    retaining means for retaining a plurality of loose wires;
    guiding means which has one end and another end, and wherein said one end is fixed to said retaining means; and
    aligning means which is slidably supported by said guiding means and which forceably aligns said plurality of loose wires, said aligning means including:
    a vertically extending aligning groove in said aligning means for aligning and storing the plurality of loose wires retained by said retaining means;
    holding means for holding said plurality of loose wires which have been stored in said aligning groove in an aligned state;
    a retaining member and a retaining block for retaining said plurality of loose wires; and wherein:
    said aligning groove is in said retaining member and is defined by vertical side walls and a bottom surface;
    means is provided for lowering said holding means toward the bottom surface; and means is provided for horizontally moving said retaining block toward said retaining member.

13. A forced aligning jig for loose wires according to claim 4, wherein said aligning means comprises a regulating member operable for regulating a retaining position in a vertical direction of the plurality of loose wires to be stored in said aligning groove at a position corresponding to a position of the regulating member of said retaining means.

* * * * *